US007877394B2

(12) United States Patent
Vignet

(10) Patent No.: US 7,877,394 B2
(45) Date of Patent: Jan. 25, 2011

(54) HIERARCHICAL TABLE

(75) Inventor: Peter Vignet, San Francisco, CA (US)

(73) Assignee: SAP AG, Walldorf (DE)

( * ) Notice: Subject to any disclaimer, the term of this patent is extended or adjusted under 35 U.S.C. 154(b) by 358 days.

(21) Appl. No.: 12/038,157

(22) Filed: Feb. 27, 2008

(65) Prior Publication Data

US 2009/0216766 A1 Aug. 27, 2009

(51) Int. Cl.
*G06F 7/00* (2006.01)
*G06F 17/30* (2006.01)
(52) U.S. Cl. ........................................ 707/752; 707/747
(58) Field of Classification Search ................... None
See application file for complete search history.

(56) References Cited

U.S. PATENT DOCUMENTS

| 6,438,580 | B1 * | 8/2002 | Mears et al. ................. 709/204 |
| 6,553,370 | B1 * | 4/2003 | Andreev et al. .................... 1/1 |
| 6,564,225 | B1 * | 5/2003 | Brogliatti et al. .................... 1/1 |
| 7,395,206 | B1 * | 7/2008 | Irwin et al. .................. 704/270 |
| 2004/0243616 | A1 * | 12/2004 | Benhase et al. ............. 707/102 |
| 2005/0021538 | A1 * | 1/2005 | Meyers et al. ............... 707/100 |

OTHER PUBLICATIONS

Gurret, C. et al., "The Sort/Sweep Algorithm: A New Method for R-Tree Based Spatial Joins", Proceedings of the 12th International Conference on Scientific and Statistical Database Management, Jul. 26, 2000, pp. 153-165.
Vaucher, J. G. "Building Optimal Binary Search Trees from Sorted Values in O(N) Time", LNCS vol. 2635, Mar. 10, 2004, pp. 376-388.
Extended European Search Report for EP Application No. 09002788.9, mailed Nov. 25, 2009, 7 pages.

* cited by examiner

*Primary Examiner*—Susan Y Chen
(74) *Attorney, Agent, or Firm*—Brake Hughes Bellermann LLP

(57) ABSTRACT

Various example embodiments are disclosed. According to one example embodiment, a method may include storing a plurality of database records, storing a value associated with each database record, receiving a request to sort the database records, sorting the database records, and sending a response message.

20 Claims, 5 Drawing Sheets

|     | 212 | | NAME ⇔ | COST ⇔ | ID ⇔ | PARENT ID ⇔ |
| --- | --- | --- | --- | --- | --- | --- |
| ▽ | | | | | | |
| | ▽ | | NODE 1 | 1,066 | 1 | 0 |
| | | ▽ | NODE 2 | 3,011 | 2 | 1 |
| | | | ▽ NODE 3 | 6,011 | 3 | 2 |
| | | | ▫ NODE 4 | 7,011 | 4 | 3 |
| | | | ▫ NODE 5 | 6,988 | 5 | 3 |
| | | ▽ | NODE 6 | 5,989 | 6 | 2 |
| | | | ▫ NODE 7 | 7,013 | 7 | 6 |
| | | | ▫ NODE 8 | 6,989 | 8 | 6 |
| | | ▽ | NODE 9 | 2,988 | 9 | 1 |
| | | | ▽ NODE 10 | 6,013 | 10 | 9 |
| | | | ▫ NODE 11 | 7,013 | 11 | 10 |
| | | | ▫ NODE 12 | 6,988 | 12 | 10 |
| | | | ▽ NODE 13 | 5,989 | 13 | 9 |
| | | | ▫ NODE 14 | 7,015 | 14 | 13 |
| | | | ▫ NODE 15 | 6,989 | 15 | 13 |
| | ▽ | | NODE 16 | 989 | 16 | 0 |
| | | ▽ | NODE 17 | 3,013 | 17 | 16 |
| | | | ▽ NODE 18 | 6,013 | 18 | 17 |
| | | | ▫ NODE 19 | 7,013 | 19 | 18 |
| | | | ▫ NODE 20 | 6,988 | 20 | 18 |
| | | ▽ | NODE 21 | 5,989 | 21 | 17 |
| | | | ▫ NODE 22 | 7,015 | 22 | 21 |
| | | | ▫ NODE 23 | 6,989 | 23 | 21 |
| | | ▽ | NODE 24 | 2,988 | 24 | 16 |
| | | | ▽ NODE 25 | 6,015 | 25 | 24 |
| | | | ▫ NODE 26 | 7,015 | 26 | 25 |
| | | | ▫ NODE 27 | 6,988 | 27 | 25 |
| | | | ▽ NODE 28 | 5,989 | 28 | 24 |
| | | | ▫ NODE 29 | 7,017 | 29 | 28 |
| | | | ▫ NODE 30 | 6,989 | 30 | 28 |

FIG. 2

|   |   |   | NAME ⇕ | COST ⇕ | ID ⇕ | PARENT ID ⇕ |
|---|---|---|---|---|---|---|
| ▽ |   |   |   |   |   |   |
|   | ▽ |   | NODE 16 | 989 | 16 | 0 |
|   |   | ▽ | NODE 24 | 2,988 | 24 | 16 |
|   |   |   | NODE 28 | 5,989 | 28 | 24 |
|   |   | ▫ | NODE 30 | 6,989 | 30 | 28 |
|   |   | ▫ | NODE 29 | 7,017 | 29 | 28 |
|   |   | ▽ | NODE 25 | 6,015 | 25 | 24 |
|   |   | ▫ | NODE 27 | 6,988 | 27 | 25 |
|   |   | ▫ | NODE 26 | 7,015 | 26 | 25 |
|   | ▽ |   | NODE 17 | 3,013 | 17 | 16 |
|   |   | ▽ | NODE 21 | 5,989 | 21 | 17 |
|   |   | ▫ | NODE 23 | 6,989 | 23 | 21 |
|   |   | ▫ | NODE 22 | 7,015 | 22 | 21 |
|   |   | ▽ | NODE 18 | 6,013 | 18 | 17 |
|   |   | ▫ | NODE 20 | 6,988 | 20 | 18 |
|   |   | ▫ | NODE 19 | 7,013 | 19 | 18 |
|   | ▽ |   | NODE 1 | 1,066 | 1 | 0 |
|   |   | ▽ | NODE 9 | 2,988 | 9 | 1 |
|   |   | ▽ | NODE 13 | 5,989 | 13 | 9 |
|   |   | ▫ | NODE 15 | 6,989 | 15 | 13 |
|   |   | ▫ | NODE 14 | 7,015 | 14 | 13 |
|   |   | ▽ | NODE 10 | 6,013 | 10 | 9 |
|   |   | ▫ | NODE 12 | 6,988 | 12 | 10 |
|   |   | ▫ | NODE 11 | 7,013 | 11 | 10 |
|   |   | ▽ | NODE 2 | 3,011 | 2 | 1 |
|   |   | ▽ | NODE 6 | 5,989 | 6 | 2 |
|   |   | ▫ | NODE 8 | 6,989 | 8 | 6 |
|   |   | ▫ | NODE 7 | 7,013 | 7 | 6 |
|   |   | ▽ | NODE 3 | 6,011 | 3 | 2 |
|   |   | ▫ | NODE 5 | 6,988 | 5 | 3 |
|   |   | ▫ | NODE 4 | 7,011 | 4 | 3 |

ROW 1 OF 30

FIG. 3

HIERARCHICAL TABLE

TECHNICAL FIELD

This description relates to tables presented on electronic media and, in particular, to the sorting of hierarchical tables by a server for presentation over a network on a client.

BACKGROUND

A Web browser may provide a Graphical User Interface (GUI) for a software application running on a client device. A browser running on a client device may interpret Hypertext Markup Language (HTML) code received from a server and display the GUI to the client. Software applications which utilize a browser on the client device communicating over a network (e.g., the Internet) with the server may be referred to as Web-based applications.

SUMMARY

According to one general aspect, a method may include storing, in a computer-readable database of a storage system connected to a computer network, a plurality of database records. The plurality of database records may include at least one parent record, at least one child record associated with at least one of the parent records, and at least one grandchild record associated with at least one of the child records. According to this aspect, the method may further include storing a value associated with each database record and receiving a request over the computer network from a client to sort the database records in either ascending or descending order. The method may further include sorting the database records in either ascending or descending order in response to receiving the request. The method may include sorting the database records by ranking the parent records in the ascending or descending order based on their values, ranking the child records associated with each parent record in the ascending or descending order based on their values, and ranking the grandchild records associated with each child record in the ascending or descending order based on the values associated with the grandchild records. In this aspect, the method may further include sending a response message to the client. The response message may be configured to cause a browser of the client to display the plurality of database records according to the sorting performed in response to the receiving the request.

In an example embodiment, the sorting the database records may include sorting a first ranked parent record, a first ranked child record associated with the first ranked parent record, grandchild records associated with the first ranked parent record in the ascending or descending order based on their ranking, subsequent child records associated with the first ranked parent record and grandchild records associated with the subsequent child records based on their rankings, and subsequent parent records, child records associated with the subsequent parent records, and grandchild records associated with the subsequent parent records based on their rankings.

In an example embodiment, the method may be performed in response to running a software program which calls a class associated with a Java programming language. In another example embodiment, sorting the database records may include providing the database records with peer rank indexes based on the rankings.

In another example embodiment, the plurality of database records may further include great-grandchild records associated with each of the grandchild records, and the sorting may further include ranking the great-grandchild records associated with each grandchild record based on a value associated with each great-grandchild record.

In another example embodiment, the sorting may include finding a first parent record from among the database records, finding child records associated with the parent record from among the plurality of database records, and finding grandchild records associated with each of the child records from among the plurality of database records.

In another example embodiment, the response message may be configured to cause a graphical user interface (GUI) of the browser of the client to display the plurality of database records according to the sorting performed in response to the receiving the request. I another example embodiment, the receiving the request may include receiving the request in response to a user clicking a sort button on the browser. In another example embodiment, the computer network may include an Internet. In another example embodiment, the method may further comprise storing a unique identification (ID) for each database record.

According to another general aspect, a computer program product for sorting a hierarchical table displayed in a graphical user interface (GUI) of a remote client may be tangibly embodied on a computer-readable medium and include executable code. When executed, the code may be configured to cause a data processing apparatus to store, in a computer-readable database of a storage system connected to a computer network, a plurality of database records, including at least one parent record, at least one child record associated with at least one of the parent records, and at least one grandchild record associated with at least one of the child records. The code may be further configured to cause the data processing apparatus to store a value associated with each database record. The code may be further configured to cause the data processing apparatus to receive a request over the computer network from the client to sort the database records in either ascending or descending order. The code may be further configured to cause the data processing apparatus to, in response to receiving the request, sort the database records in the either ascending or descending order by ranking the parent records in the ascending or descending order based on their values, ranking the child records associated with each parent record in the ascending or descending order based on their values, and ranking the grandchild records associated with each child record in the ascending or descending order based on their values. The code may be further configured to cause the data processing apparatus to send a response message to the client. The response message may be configured to cause the GUI of the client to display the plurality of database records according to the sorting performed in response to the receiving the request.

In an example embodiment, the sorting the database records may include sorting a first ranked parent record, a first ranked child record associated with the first parent record, grandchild records associated with the first parent record in the ascending or descending order based on their ranking, subsequent child records associated with the first ranked parent record and grandchild records associated with the subsequent child records based on their rankings, and subsequent parent records, child records associated with the subsequent parent records, and grandchild records associated with the child records associated with the subsequent parent records based on their rankings.

In another example embodiment, the computer program product may include a software program written in a Java programming language.

In another example embodiment, the sorting the database records may include providing the database records with peer rank indexes based on the rankings.

In another example embodiment, the plurality of database records may further include great-grandchild records associated with each of the grandchild records, and the sorting may further include ranking the great-grandchild records associated with each grandchild record based on a value associated with each great-grandchild record.

In another example embodiment, the sorting may include finding a first parent record from among the database records, finding child records associated with the parent record from among the plurality of database records, and finding grandchild records associated with each of the child records from among the plurality of database records.

In another example embodiment, the response message may be configured to cause the GUI of the client to display the plurality of database records according to the sorting performed in response to the receiving the request. In another example embodiment, the receiving the request may include receiving the request in response to a user clicking a sort button on the browser. In another example embodiment, the computer network may include an Internet. In another example embodiment, the computer program product may be configured to store a unique identification (ID) for each database record.

The details of one or more implementations are set forth in the accompanying drawings and the description below. Other features will be apparent from the description and drawings, and from the claims.

BRIEF DESCRIPTION OF THE DRAWINGS

FIG. 2 is a diagram showing a table according to an example embodiment.

FIG. 3 is a diagram showing the table which has been sorted according to an example embodiment.

DETAILED DESCRIPTION

Figure 1:
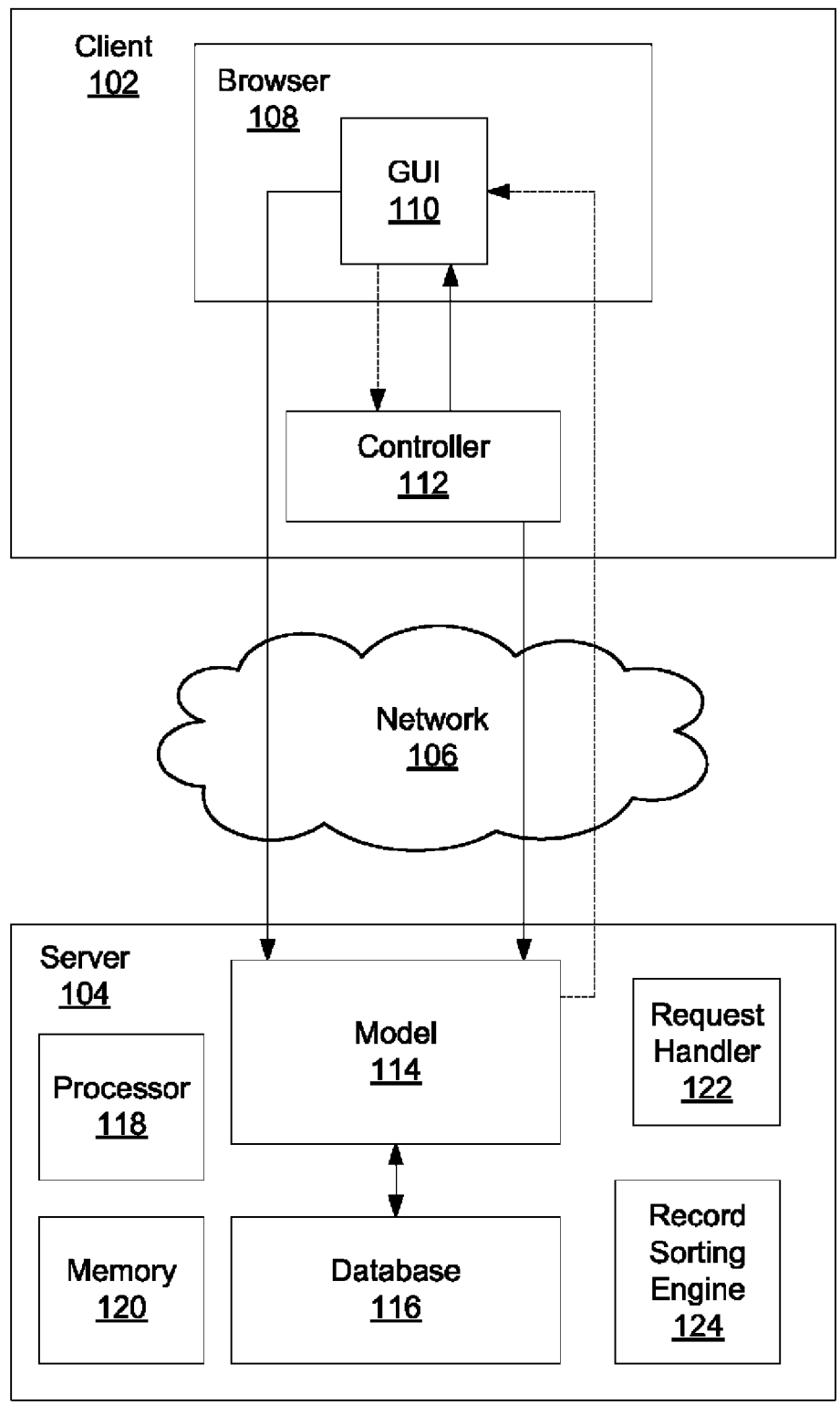
FIG. 1 is a block diagram showing a client and a server which may communicate over a network according to an example embodiment.

FIG. 1 is a block diagram showing a client 102 and a server 104 which may communicate over a network 106 according to an example embodiment. The client 102 may include, for example, a desktop or notebook computer, a personal digital assistant (PDA), a smartphone, or a mobile phone, according to example embodiments.

The client 102 may include a browser 108. The browser 108, which may include Internet Explorer, Mozilla Firefox, or Netscape Navigator according to example embodiments, may display graphical images and may receive input from a user. For example, the browser may display buttons that, when clicked on by the user, prompt the client 102 to send messages to the server 104. The server 104 may respond to the clicked buttons by performing processes and/or sending messages to the client 102, as described further below. The browser 108 may also include fields which the user may fill with text, which the client 102 may send to the server 104. The server 104 may respond to receiving the text by performing processes and/or sending messages to the client 102.

The browser 108 may include a graphical user interface (GUI) 110. The GUI 110 may include objects such as the buttons or fields described above, and/or tables or lists, which may themselves include buttons and/or fields. The client 102 may display the GUI 110 to the user as output, and may receive input from the user via the GUI 110.

The client 102 may communicate with the server 104 via the network 106. The network 106 may include the Internet, according to an example embodiment. The client 102 may communicate with the server via the Internet using, for example, the Hypertext Transfer Protocol (HTTP).

In an example embodiment using a model-view-controller (MVC) architectural pattern, the client 102 may include a controller 112, and the server 104 may include a model 114. The model 114 may create a domain-specific representation of information on which an application, such as a spreadsheet or table, may operate. The model 114 may add meaning to raw data, such as fields or rows in a spreadsheet or table. The controller 112 may process and respond to events, such as user actions of clicking buttons or filling fields on the GUI 110, and may invoke changes in the model 114. The solid line from the GUI 110 to the model 114 illustrates the direct response of the model 114 to actions performed by the user on the GUI 110, whereas the dashed line from the model 114 to the GUI 110 illustrates the graphical changes displayed on the GUI in response to changes in the model 114. The solid lines from the controller 112 to the GUI 110 and the model 114 illustrate changes directly invoked in the GUI 110 and the model 114, respectively, by the controller 112. For example, the controller 112 may update the model 114 based on the user's input to the GUI 110. The dashed line from the GUI 110 to the controller 112 shows the observation of changes and actions in the GUI 110 by the controller 112.

The server 104 may also include a database 116. The database 116 may store data, such as database records (shown in FIGS. 2 and 3), which are accessed and/or modified by the model 114 during use of an application, such as a spreadsheet or table. The server 104 may include a processor 118, such as a microprocessor, which may execute operations to control processes performed by the server 104. The server 104 may also include a memory 120, which may store information. The database 116 may or may not be a component of the memory 120. The memory 120 and/or database 116 may be computer readable, and may be associated with a storage system. The server 104 may also include a request handler 122, which may handle requests received from the client 102, and a record sorting engine 124, the functions of which are described below.

In an example embodiment, the GUI 110 may include a table. FIG. 2 is a diagram showing a table 200 according to an example embodiment. In this example, the table 200 may include a plurality of database records 202. In the example shown in FIG. 2, each database record 202 may be displayed as a single row in the table 200. The database records 202 may be stored by the database 116.

Each database record 202 may be associated with a name 204. In the example shown in FIG. 2, the name 204 may be "Node" followed by a unique number associated with the database record 202. Each database record 202 may also be associated with a value 206. In the example shown in FIG. 2, the value 206 associated with each database record is a cost represented by an integer; however, the values 206 may include other types of data, such as numbers which may include fractions or decimals, or string values. Each database record 202 may also be associated with a unique identification (ID) 208. In the example shown in FIG. 2, the unique IDs 208 associated with each database record are sequential integer numbers. However, the unique IDs 208 may be any type of data which distinguishes each database record 202 from other database records, such as numbers, binary sequences, or string values.

The database records 202 may be organized in a hierarchy independent of their names 204, values 206, or unique IDs 208. The hierarchy may, for example, classify each of the database records 202 as parents, children, grandchildren, and so forth. In this example, the database records 202 may include one or more parent records, at least one child record associated with each of the parent records, and at least one grandchild record associated with each child record. The database records 202 may also include great-grandchild records associated with each grandchild record, and so forth. While this example uses the terms parent record, child record, and grandchild record, other relational terms may be used to demonstrate the hierarchy of the database records 202 in the table 200.

Each database record 202 may each be associated with a parent identification (ID) 210 indicative of the hierarchy. The parent ID 210 of a grandchild record may be the unique ID 208 of the child record with which the grandchild record is associated. The parent ID 210 of a child record may be the unique ID 208 of the parent record with which the child record is associated. The parent ID 210 of a parent record may a "root" node, or zero, according to an example embodiment.

The table 200 may also display a hierarchy indicator 212 for each database record 202. In the example shown in FIG. 2, the two inverted triangles which are farthest left indicate that Node 1 and Node 16 are parent records. The four inverted triangles which are to the right of the two aforesaid inverted triangles indicate that Node 2 and Node 9 are child records associated with Node 1, and Node 17 and Node 24 are child records associated with Node 16. The eight inverted triangles which are farthest right indicate that Node 3 and Node 6 are grandchild records associated with Node 2, Node 10 and Node 13 are grandchild records associated with Node 9, Node 18 and Node 21 are grandchild records associated with Node 17, and Node 25 and Node 28 are grandchild records associated with Node 24. The sixteen dashes indicate that Node 4 and Node 5 are great-grandchild records associated with node 3, Node 7 and Node 8 are great-grandchild records associated with Node 6, Node 11 and Node 12 are great-grandchild records associated with Node 10, Node 14 and Node 15 are great-grandchild records associated with Node 13, Node 19 and Node 20 are great-grandchild records associated with Node 18, Node 22 and Node 23 are great-grandchild records associated with Node 21, Node 26 and Node 27 are great-grandchild records associated with Node 25, and Node 29 and Node 30 are great-grandchild records associated with Node 28. While a graphical representation of the hierarchy indicator 212 is shown in FIG. 2, other graphical or non-graphical representations may be used. For example, the hierarchy indicator 212 may display the name 204 or unique ID 208 of the parent record, parent of the parent record, and so on.

In the example shown in FIG. 2, the database records 202 are sorted based on their unique IDs 208. However, a user may want to sort the database records 202 based on their values 206, which, in the example shown in FIG. 2, represent a cost associated with each database record 202. In an example embodiment, the user may click on a sort button 214, which may include an up arrow and/or a down arrow, in the GUI 106. The client 102 may, in response to the user clicking the sort button 214, send a request over the network 106 to the server 104 to sort the database records 202 in either ascending or descending order. In example embodiments, the request may request the server to sort the database records 202 in ascend-ing or descending order based on whether the user clicked the up arrow or the down arrow of the sort button 214, or the request may always be a request to sort the database records 202 in ascending order or descending order.

The server 104 may receive the request to sort the database records 202 in either ascending or descending order. The server 104 may receive the request via, for example, the model 114. The request handler 122 may handle the request, according to an example embodiment. The request handler 122 may, for example, instruct the record sorting engine 124 to sort the database records 202 in either ascending or descending order. The server 104, using the request handler 122 and/or the record sorting engine 124, may sort the database records 202 in response to receiving the request. The sorting and/or other methods or processes performed by the server 104, request handler 122, and/or record sorting engine 124 may be performed in response to running a software program which calls a class associated with the Java programming language.

In an example embodiment, the record sorting engine 124 may sort the database records 202 by ranking the parent records in ascending or descending order based on their values 206 (which are associated with the parent records), ranking the child records associated with each parent record in the ascending or descending order based on their values 206 (which are associated with the child records), and ranking the grandchild records associated with each child record in the ascending or descending order based on their values 206 (which are associated with the child records)

Sorting the database records 202 may include, for example, sorting a first ranked parent record, sorting a first ranked child record associated with the first parent record, sorting grandchild records associated with the first parent record in the ascending or descending order based on their ranking, sorting subsequent child records associated with the first ranked parent record and grandchild records associated with the subsequent child records based on their rankings, and sorting subsequent parent records, child records associated with the subsequent parent records, and grandchild records associated with the child records associated with the subsequent parent records based on their rankings.

Sorting the database records 202 may include finding a first parent record from among the database records 202, finding child records associated with the parent record from among the plurality of database records 202, and finding grandchild records associated with each of the child records from among the plurality of database records 202, according to an example embodiment. According to another example embodiment, sorting the database records 202 may include providing the database records 202 with peer rank indexes based on the rankings. The peer rank indexes may, for example, rank the grandchild records associated with each child record, rank the child records associated with each parent record, and rank the parent records.

The server 104 may send a response message to the client 102. The response message may cause the browser 108 and/or the GUI 110 to display the database records 202 (such as in the form of the table 200) according to the sorting performed in response to receiving the request.

FIG. 3 is a diagram showing the table 200 which has been sorted according to an example embodiment. In this example, the database records 202 have been sorted in ascending order based on their value 206, which represents cost. As shown in FIG. 3, Node 16 has been ranked above Node 1 based on Node 16's cost of 989 compared to Node 1's cost of 1,066. Node 24 has been ranked above Node 17, both of which are child records associated with Node 16, based on Node 24's cost of 2,988 compared to Node 17's cost of 3,013. Node 28 has been ranked above Node 25, both of which are grandchild records associated with Node 24, based on Node 28's cost of 5,989 compared to Node 25's cost of 6,015. Node 30 has been ranked above Node 29, both of which are great-grandchild records associated with Node 28, based on Node 30's cost of 6,989 compared to Node 29's cost of 7,017. Other rankings are evident from the table 200 shown in FIG. 3. As shown in FIG. 3, the hierarchy of parent records, child records, grandchild records, and great-grandchild records has been preserved after the sorting based on the value 206 which represents cost. The database records 202 could also be ranked in descending order, in which example Node 1 would be ranked above Node 16, Node 17 would be ranked above Node 24, et cetera.

Figure 4:
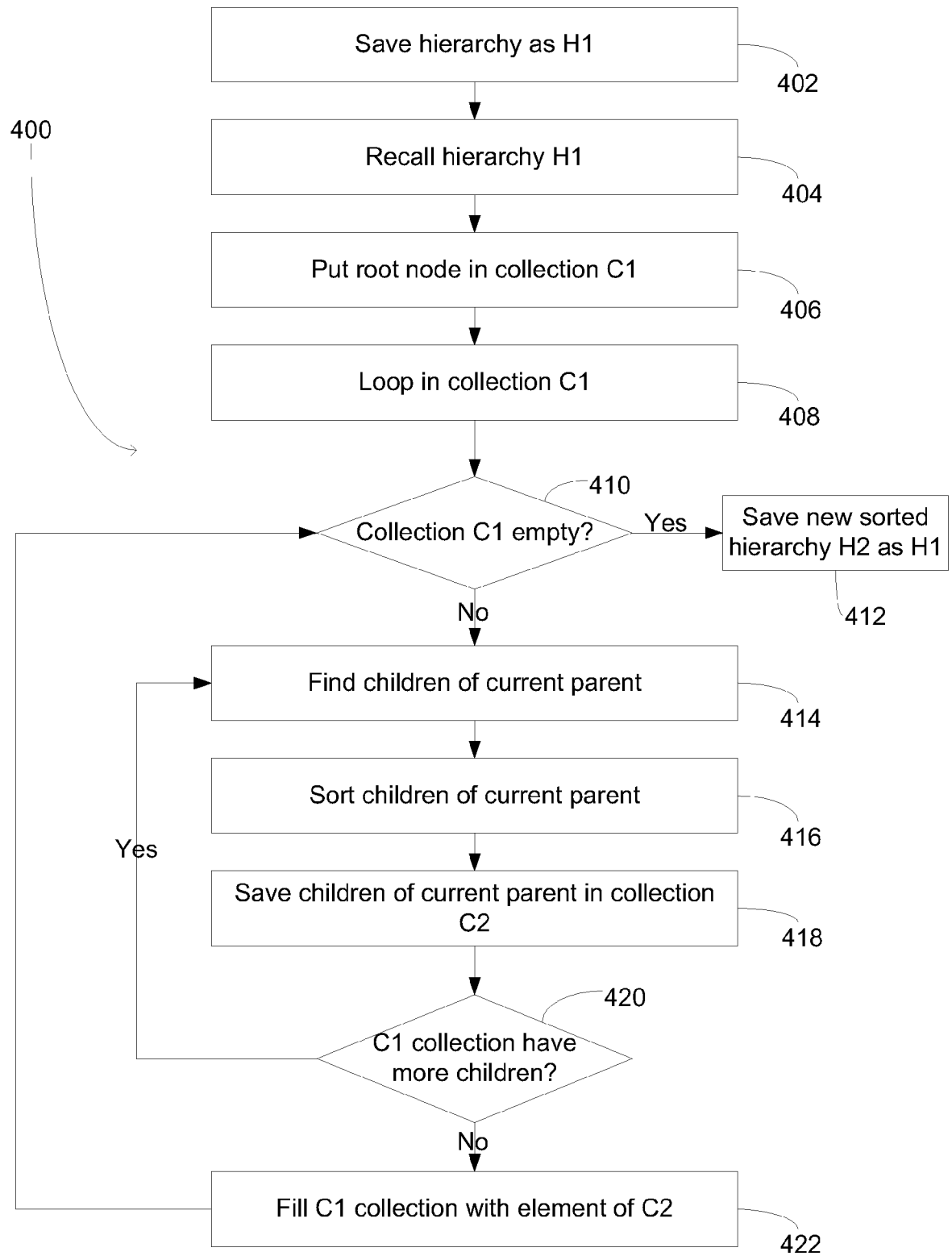
FIG. 4 is a flowchart showing a method according to an example embodiment.

FIG. 4 is a flowchart showing a method 400 according to an example embodiment. According to this example, the method 400 may include saving a hierarchy as H1 (402). The hierarchy may include, for example, a plurality of database records including parent records, child records associated with each parent record, grandchild records associated with each child record, great-grandchild records associated with each grandchild record, etcetera. The method 400 may further include recalling the previously saved hierarchy H1 (404). The method 400 may further include creating a collection C1 and, starting with a root node of the saved hierarchy HI, putting the root node into the collection C1 (406).

The method 400 may include looping in the collection C1 (408). Looping in the collection C1 (408) may include determining whether the collection C1 is empty (410). If the collection C1 is empty, then the method 400 may include saving a new sorted hierarchy H2 as the hierarchy H1 (412). If the collection C1 is not empty, then the method 400 may include finding the children or child records of the current parent record (414). The method 400 may further include sorting the child records of the current parent records (416). The child records may be sorted according to a selected attribute or value 206, such as cost. The child records may be given a peer index based on the sorting. The resorted hierarchy of the parent record may be saved in a new parent node table hierarchy H2. The method 400 may also include saving the sorted child records of the current parent in a temporary collection C2 (418).

The method 400 may further include determining whether the C1 collection has more child records (420). If the C1 collection does have more children, then the method 400 may include finding children of the current parent (414), sorting the children of the current parent (416), and saving the children of the current parent in a temporary collection (418), until all of the children of the C1 collection, which are children of the current parent, have been sorted and saved. When the C1 collection does not have more children, the method 400 may include filling the C1 collection with the elements, such as child records and parent records, of the collection C2. The method 400 may then repeat determining whether the collection C1 is empty (410).

Figure 5:
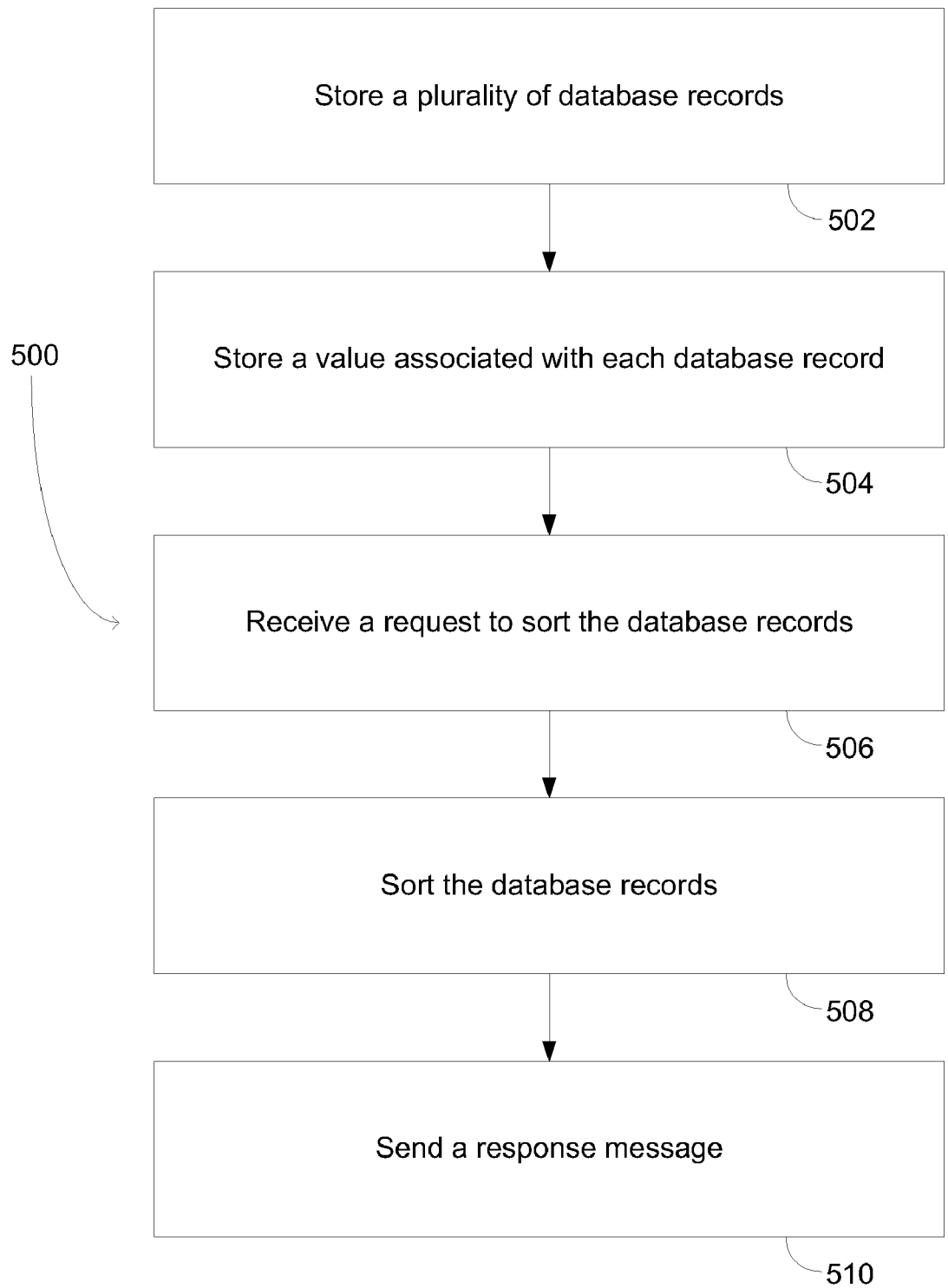
FIG. 5 is a flowchart showing a method according to another example embodiment.

FIG. 5 is a flowchart showing a method 500 according to another example embodiment. The method 500 may, for example, be performed in response to running a software program which calls a class associated with the Java programming language.

In the example shown in FIG. 5, the method 500 may include storing a plurality of database records 202 (502). The database records 202 may, for example, be stored in a computer-readable database 116 of a storage system connected to a computer network 106. The network 106 may, for example, include the Internet. The database records 202 may include at least one parent record, at least one child record associated with at least one of the parent records, and at least one grandchild record associated with at least one of the child records.

The method 500 may also include storing a value 206 associated with each database record 202 (504). A unique ID 208 may also be stored for each database record 202.

The method 500 may also include receiving a request to sort the database record (506). The request may, for example, be received over the computer network 106 from a client 102 to sort the database records 202 in either ascending or descending order. The request may be received in response to a user clicking a sort button 214 on a browser 108 or GUI 110. The request may specify whether the database records 202 are to be sorted in ascending or descending order, or the request may automatically be interpreted to as a request to sort the database records 202 in either ascending order or descending order.

The method 500 may also include sorting the database records (508). Sorting the database records (508) may, for example, be performed in response to receiving the request to sort the database records (506). Sorting the database records (508) may include ranking the parent records in the ascending or descending order based on their values 206, ranking the child records associated with each parent record in the ascending or descending order based on their values 206, and ranking the grandchild records associated with each child record in the ascending or descending order based on the values 206 associated with the grandchild records.

In an example embodiment, sorting the database records (508) may include sorting a first ranked parent record, a first ranked child record associated with the first parent record, grandchild records associated with the first parent record in the ascending or descending order based on their ranking, subsequent child records associated with the first ranked parent record and grandchild records associated with the subsequent child records based on their rankings, and subsequent parent records, child records associated with the subsequent parent records, and grandchild records associated with the child records associated with the subsequent parent records based on their rankings.

In an example embodiment, sorting the database records (508) may include providing the database records 202 with peer rank indexes based on the rankings.

In an example embodiment, sorting the database records (508) may include finding a first parent record from among the database records 202, finding child records associated with the parent record from among the plurality of database records, and finding grandchild records associated with each of the child records from among the plurality of database records.

In an example embodiment, the database records 202 may also include great-grandchild records associated with each of the grandchild records. In this example, the sorting the database records 202 (508) may further include ranking the great-grandchild records associated with each grandchild record based on a value 206 associated with each great-grandchild record.

The method 500 may further include sending a response message (510). The response message may cause the browser 508 and/or GUT 110 of the client 102 to display the plurality of database records 202, such as in a table format, according to the sorting performed in response to the receiving the request.

In an example embodiment, some of the methods and processes described above may be implemented by running the following code, written in the Java programming language:

```
    public void
onActionPseudoSort(com.sap.tc.webdynpro.progmodel.api.IWDCustomEvent
wdEvent )
    {
        this.resortpar( ); // resort the parent-child hashtable , ranking the children for
each parent according their "Cost".
        this.rebuildFlat( ); // rebuild the context node according the parent-child
hastable sorted in the previous step.
    }
//resortpar re-sorts the parent-child hashtable. The parent child hastable is a
hastable, the key is the parent node id.
/The value is a hastable called inner hastable. The inner hastable as a key , that is
the ranking of the child, the value is the element.
/ the ranking of the child is base in this cas on the "Cost" value.
public void resortpar( ) {
                Hashtable hashid =
wdContext.currentContextElement( ).getHashId( );
                Hashtable hashpar =
wdContext.currentContextElement( ).getHashParId( );
                IPrivateTreeMoverCV.ITableNode nd = wdContext.nodeTable( );
                IPrivateTreeMoverCV.IFlatNode ndf = wdContext.nodeFlat( );
                IPrivateTreeMoverCV.ITableElement el1;
                IPrivateTreeMoverCV.ITableElement el2;
                IPrivateTreeMoverCV.IFlatElement ef1;
                IPrivateTreeMoverCV.IFlatElement ef2;
                ArrayList ar1 = new ArrayList(hashpar.keySet( ));
                Collections.sort(ar1);
                for (int i = 0; i < ar1.size( ); i++) {
                        Integer Int = (Integer) ar1.get(i);
                        Hashtable inner = (Hashtable) hashpar.get(Int);
                        if (inner.isEmpty( )) continue;
                        ArrayList ar2 = new ArrayList(inner.keySet( ));
                        double db = 100000;
                        Hashtable hashtemp = new Hashtable( );
                        for (int j = 0; j < ar2.size( ); j++) {
                                Integer I = (Integer) ar2.get(j);
                                el1 = (IPrivateTreeMoverCV.ITableElement)
inner.get(I);
                                double cost = db + el1.getCost( );
                                String costst = new Double(db +
el1.getCost( )).toString( ) + "-" + I.toString( );
                                hashtemp.put(costst, el1);
                        }
                        ArrayList ar3 = new ArrayList(hashtemp.keySet( ));
                        Collections.sort(ar3);
                        Hashtable inner2 = new Hashtable( );
                        for (int m = 0; m < ar3.size( ); m++) {
                                String key3 = ar3.get(m).toString( );
                                if (!hashtemp.containsKey(key3))
                                        continue;
                                el2 = (IPrivateTreeMoverCV.ITableElement)
hashtemp.get(key3);
                                inner2.put(new Integer(m), el2);
}
                        hashpar.put(Int, inner2);
                }
        }
// the table node is rebuilt according the the parent child hashtable.
// It is built starting with the first node under the root according the sorting of the
parent-child table.
public void rebuildFlat( ) {
                Hashtable hashparid =
wdContext.currentContextElement( ).getHashParId( );
                Hashtable hashid =
wdContext.currentContextElement( ).getHashId( );
                IPrivateTreeMoverCV.ITableNode nd = wdContext.nodeTable( );
                IPrivateTreeMoverCV.ITableElement el, elinner0, elinner1,
elinner2, elinner3;
                el = null;
                IPrivateTreeMoverCV.ITableElement el2, elpar;
                IPrivateTreeMoverCV.IFlatElement ef1;
                IPrivateTreeMoverCV.IFlatElement ef2;
                IPrivateTreeMoverCV.IFlatNode ndf = wdContext.nodeFlat( );
                Hashtable htable = new Hashtable( );
                ndf.invalidate( );
                ArrayList arpar0 = new ArrayList( );
                ArrayList arpar1 = new ArrayList( );
                ArrayList arpar2 = new ArrayList( );
                ArrayList arpar3 = new ArrayList( );
```

```
            ArrayList arpar4 = new ArrayList( );
            ArrayList ar0 = new ArrayList( );
            ArrayList ar1 = new ArrayList( );
            ArrayList ar2 = new ArrayList( );
            ArrayList ar3 = new ArrayList( );
            ArrayList ar4 = new ArrayList( );
            arpar0.add(new Integer(0));
            Integer parid0 = new Integer(0);
            Hashtable inner0 = (Hashtable) hashparid.get(parid0);
            ar0 = new ArrayList(inner0.keySet( ));
            Collections.sort(ar0);
            for (int j = 0; j < ar0.size( ); j++) {
                Integer id0 = (Integer) ar0.get(j);
                elinner0 = (IPrivateTreeMoverCV.ITableElement) inner0.get(id0);
                if (elinner0.getAdded( ))
                    continue;
                ef1 = ndf.createFlatElement( );
                ndf.addElement(ef1);
                WDCopyService.copyCorresponding(elinner0, ef1);
                elinner0.setAdded(true);
                Integer parid1 = new Integer(ef1.getId( ));
                if (!hashparid.containsKey(parid1))
                    continue;
                Hashtable inner1 = (Hashtable) hashparid.get(parid1);
                if (inner1.isEmpty( ))
                    continue;
                ar1 = new ArrayList(inner1.keySet( ));
                Collections.sort(ar1);
                for (int j1 = 0; j1 < ar1.size( ); j1++) {
                    Integer id1 = (Integer) ar1.get(j1);
                    elinner1 = (IPrivateTreeMoverCV.ITableElement) inner1.get(id1);
                    if (elinner1.getAdded( ))
                    continue;
                    ef1 = ndf.createFlatElement( );
                    ndf.addElement(ef1);
                    WDCopyService.copyCorresponding(elinner1, ef1);
                    elinner1.setAdded(true);
                    Integer parid2 = new Integer(ef1.getId( ));
                    if (!hashparid.containsKey(parid2))
                        continue;
                    Hashtable inner2 = (Hashtable) hashparid.get(parid2);
                    if (inner2.isEmpty( ))
                        continue;
                    ar2 = new ArrayList(inner2.keySet( ));
                    Collections.sort(ar2);
                    for (int j2 = 0; j2 < ar2.size( ); j2++) {
                        Integer id2 = (Integer) ar2.get(j2);
                        elinner2 = (IPrivateTreeMoverCV.ITableElement) inner2.get(id2);
                        if (elinner2.getAdded( ))
                            continue;
                        ef1 = ndf.createFlatElement( );
                        ndf.addElement(ef1);
                        WDCopyService.copyCorresponding(elinner2, ef1);
                        elinner2.setAdded(true);
                        Integer parid3 = new Integer(ef1.getId( ));
                        Hashtable inner3 = (Hashtable) hashparid.get(parid3);
                        if (inner3.isEmpty( )) continue;
                        ar3 = new ArrayList(inner3.keySet( ));
                        Collections.sort(ar3);
                        for (int j3 = 0; j3 < ar3.size( ); j3++) {
                            Integer id3 = (Integer) ar3.get(j3);
                            elinner3 = (IPrivateTreeMoverCV.ITableElement) inner3.get(id3);
                            ef1 = ndf.createFlatElement( );
                            ndf.addElement(ef1);
                            WDCopyService.copyCorresponding(elinner3, ef1);
                            elinner3.setAdded(true);
                        }
                    }
                }
            }
        }
```

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    storing, in a server connected to a computer network, a plurality of database records, the database records being organized in a hierarchy and including at least two parent records, at least two child records associated with each of the parent records, and at least two grandchild records associated with each of the child records;
    storing, by the server, a cost associated with each database record, the cost being independent of the hierarchy, wherein the cost is hashed from a key string for ranking each child in the hierarchical database into an integer value by the server;
    receiving, by the server, a request over the computer network from a client to sort the database records based on the costs associated with the database records in either ascending or descending order;
    in response to the receiving the request, sorting, by the server, the database records in the either ascending or descending order by:
        ranking the parent records in the ascending or descending order based on the costs associated with the database records;
        ranking the child records associated with each parent record in the ascending or descending order based on their costs and their associated parent; and
        ranking the grandchild records associated with each child record in the ascending or descending order based on their costs and their associated child; and
    sending a response message, from the server to the client, the response message being configured to cause a browser of the client to display all of the plurality of database records according to the sorting performed in response to the receiving the request.

2. The method of claim 1 wherein the sorting the database records includes sorting:
    a first ranked parent record;
    a first ranked child record associated with the first parent record;
    grandchild records associated with the first parent record in the ascending or descending order based on their ranking;
    subsequent child records associated with the first ranked parent record and grandchild records associated with the subsequent child records based on their rankings; and
    subsequent parent records, child records associated with the subsequent parent records, and grandchild records associated with the child records associated with the subsequent parent records based on their rankings.

3. The method of claim 1, wherein the method is performed in response to running a software program which calls a class associated with a Java programming language.

4. The method of claim 1, wherein the sorting the database records includes providing the database records with peer rank indexes based on the rankings.

5. The method of claim 1, wherein:
the plurality of database records further include great-grandchild records associated with each of the grandchild records; and
the sorting further includes ranking the great-grandchild records associated with each grandchild record based on a cost associated with each great-grandchild record, the cost being independent of the hierarchy and hashed from the key string.

6. The method of claim 1, wherein the sorting includes:
finding a first parent record from among the database records;
finding child records associated with the parent record from among the plurality of database records; and
finding grandchild records associated with each of the child records from among the plurality of database records.

7. The method of claim 1, wherein the response message is configured to cause a graphical user interface (GUI) of the browser of the client to display the plurality of database records according to the sorting performed in response to the receiving the request.

8. The method of claim 1, wherein the receiving the request includes receiving the request in response to a user clicking a sort button on the browser.

9. The method of claim 1, wherein the computer network includes an Internet.

10. The method of claim 1, further comprising storing a unique identification (ID) for each database record.

11. A computer program product for sorting a hierarchical table displayed in a graphical user interface (GUI) of a remote client, the computer program product being tangibly embodied on a computer-readable medium and including executable code that, when executed, is configured to cause a data processing apparatus to:
store, in a computer-readable database of a storage system connected to a computer network, a plurality of database records, the database records being organized in a hierarchy and including at least two parent records, at least two child records associated with each of the parent records, and at least two grandchild records associated with each of the child records;
store a cost associated with each database record, the cost being independent of the hierarchy, wherein the cost is hashed from a key string for ranking each child in the hierarchical database into an integer value by the server;
receive a request over the computer network from the client to sort the database records based on the costs associated with the database records in either ascending or descending order;
in response to the receiving the request, sort the database records in the either ascending or descending order by:
ranking the parent records in the ascending or descending order based on the costs associated with the database records;
ranking the child records associated with each parent record in the ascending or descending order based on their costs and their associated parent; and
ranking the grandchild records associated with each child record in the ascending or descending order based on their costs and their associated child; and
send a response message to the client, the response message being configured to cause the GUI of the client to display the plurality of database records according to the sorting performed in response to the receiving the request.

12. The computer program product of claim 11 wherein the sorting the database records includes sorting:
a first ranked parent record;
a first ranked child record associated with the first parent record;
grandchild records associated with the first parent record in the ascending or descending order based on their ranking;
subsequent child records associated with the first ranked parent record and grandchild records associated with the subsequent child records based on their rankings; and
subsequent parent records, child records associated with the subsequent parent records, and grandchild records associated with the child records associated with the subsequent parent records based on their rankings.

13. The computer program product of claim 11, wherein the computer program product includes a software program written in a Java programming language.

14. The computer program product of claim 11, wherein the sorting the database records includes providing the database records with peer rank indexes based on the rankings.

15. The computer program product of claim 11, wherein:
the plurality of database records further include great-grandchild records associated with each of the grandchild records; and
the sorting further includes ranking the great-grandchild records associated with each grandchild record based on a cost associated with each great-grandchild record, the cost being independent of the hierarchy and hashed from the key string.

16. The computer program product of claim 11, wherein the sorting includes:
finding a first parent record from among the database records;
finding child records associated with the parent record from among the plurality of database records; and
finding grandchild records associated with each of the child records from among the plurality of database records.

17. The computer program product of claim 11, wherein the response message is configured to cause the GUI of the client to display the plurality of database records according to the sorting performed in response to the receiving the request.

18. The computer program product of claim 11, wherein the receiving the request includes receiving the request in response to a user clicking a sort button on the browser.

19. The computer program product of claim 11, wherein the computer network includes an Internet.

20. The computer program product of claim 11, wherein the computer program product is further configured to store a unique identification (ID) for each database record.

* * * * *